United States Patent
Hong

(10) Patent No.: US 11,419,049 B2
(45) Date of Patent: Aug. 16, 2022

(54) NETWORK ACCESS METHOD AND APPARATUS, USER EQUIPMENT, AND BASE STATION

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/759,597

(22) PCT Filed: Nov. 3, 2017

(86) PCT No.: PCT/CN2017/109269
§ 371 (c)(1),
(2) Date: Apr. 27, 2020

(87) PCT Pub. No.: WO2019/084901
PCT Pub. Date: May 9, 2019

(65) Prior Publication Data
US 2020/0280914 A1    Sep. 3, 2020

(51) Int. Cl.
*H04W 76/15* (2018.01)
*H04W 48/20* (2009.01)
*H04W 84/04* (2009.01)

(52) U.S. Cl.
CPC .......... *H04W 48/20* (2013.01); *H04W 76/15* (2018.02); *H04W 84/045* (2013.01)

(58) Field of Classification Search
CPC ... H04W 48/20; H04W 84/045; H04W 76/15; H04W 48/10; H04W 36/00; H04W 36/08;
(Continued)

(56) References Cited

U.S. PATENT DOCUMENTS 9,998,900 B1*  6/2018  Yoo ........................ H04W 88/08
2009/0180428 A1*  7/2009  Viswanath ............ H04W 48/20
370/328
(Continued)

FOREIGN PATENT DOCUMENTS

CN         1838820 A      9/2006
CN       101772129 A      7/2010
(Continued)

OTHER PUBLICATIONS

English translation of the Written Opinion of the International Search Authority in the International Application No. PCT/CN2017/109269, dated Jul. 23, 2018.
(Continued)

*Primary Examiner* — Jean A Gelin
(74) *Attorney, Agent, or Firm* — Finnegan, Henderson, Farabow, Garrett & Dunner, L.L.P.

(57) ABSTRACT

The present disclosure relates to a network access method and apparatus, user equipment, and a base station. The network access method includes: determining, on the basis of a traffic type of data to be transmitted and a service type of at least one wireless backhaul small base station, a wireless backhaul small base station to be accessed; and accessing the wireless backhaul small base station. According to the technical solution of the present disclosure, by means of wireless backhaul small base stations deployed in different regions and supporting different traffic types, corresponding services are provided for user equipment, so that the user equipment can be served better.

7 Claims, 12 Drawing Sheets

---

Preferentially select, when no base station is accessed, a macro base station with a wired backhaul capability for access — 401

↓

Determine, based on a traffic type of data to be transmitted and a service type of at least one detected wireless backhaul small base station, a wireless backhaul small base station to be accessed — 402

↓

Establish a secondary connection with the wireless backhaul small base station while maintaining a connection with the macro base station — 403

(58) Field of Classification Search
CPC . H04W 36/30; H04W 52/0206; H04W 52/02; H04W 52/143; H04W 52/245
See application file for complete search history.

(56) References Cited

U.S. PATENT DOCUMENTS

| | | | |
|---|---|---|---|
| 2010/0091651 A1 | 4/2010 | Chin et al. | |
| 2013/0053048 A1* | 2/2013 | Garcia | H04L 12/5692 455/450 |
| 2014/0011543 A1* | 1/2014 | Li | H04W 52/0206 455/561 |
| 2014/0126438 A1* | 5/2014 | Zhu | H04J 11/0093 370/311 |
| 2015/0016350 A1 | 1/2015 | Moulsley et al. | |
| 2015/0223123 A1 | 8/2015 | Tomiyasu | |
| 2016/0057688 A1* | 2/2016 | Koskinen | H04W 48/16 370/332 |
| 2016/0100426 A1 | 4/2016 | Fang et al. | |
| 2016/0219475 A1* | 7/2016 | Kim | H04W 28/08 |
| 2018/0343608 A1 | 11/2018 | Duan et al. | |
| 2019/0261226 A1* | 8/2019 | Ayaz | H04W 4/02 |
| 2019/0335388 A1* | 10/2019 | Bulakci | H04W 24/02 |

FOREIGN PATENT DOCUMENTS

| | | |
|---|---|---|
| CN | 102740414 A | 10/2012 |
| CN | 103313318 A | 9/2013 |
| CN | 104244372 A | 12/2014 |
| CN | 104717632 A | 6/2015 |
| CN | 104735638 A | 6/2015 |
| EP | 2 824 971 A1 | 1/2015 |
| EP | 3 322 223 A1 | 5/2018 |
| WO | WO 2017/063485 A1 | 4/2017 |

OTHER PUBLICATIONS

International Search Report in the International Application No. PCT/CN2017/109269, dated Jul. 23, 2018.
First Office Action of Chinese Application No. 201780001901.4, dated Sep. 2, 2020.
Extended European Search Report in corresponding European Application No. 17930967.9 dated Jun. 2, 2021.
3GPP TR 36.842 V12.0.0 (Dec. 2013), 3rd Generation Partnership Project; Technical Specification Group Radio Access Network; Study on Small Cell enhancements for E-UTRA and E-UTRAN; Higher layer aspects (Release 12), section 7.1.1., 2 pages.

* cited by examiner

NETWORK ACCESS METHOD AND APPARATUS, USER EQUIPMENT, AND BASE STATION

CROSS REFERENCE TO RELATED APPLICATIONS

This application is a national phase application based on PCT/CN2017/109269, filed Nov. 3, 2017, the content of which is incorporated herein by reference.

TECHNICAL FIELD

The disclosure relates to the technical field of communication, and more particularly, to a method and device for accessing a network, user equipment (UE), and a base station.

BACKGROUND

In the research and discussion of a $5^{th}$ generation mobile communication technology (5G) project, in order to meet the requirements of more diversified traffic, higher rate, larger numbers of connections and the like, 5G networks need to significantly improve spectrum efficiency. Due to the transmission characteristics of high frequency bands, base stations using high frequency bands for transmissions are generally small base stations (i.e., small cells). If each small base station is configured with a traditional wired backhaul link such as an optical fiber link, the cost is high, and the backhaul link deployment is complex.

In order to reduce the deployment complexity of a backhaul link, in the research and discussion of the 5G project, an integrated access and backhaul solution was proposed. That is, both data transmission between a small base station and a UE and data transmission between a base station and a core network are performed by using the same wireless communication system protocol through wireless links. Therefore, wireless backhaul small stations are usually used in 5G networks for high frequency band transmissions. In addition, in order to meet different requirements for traffics in different regions, for example, the demand for Internet access traffics in shopping malls is high, and the demand for video browsing traffics in railway stations is high, etc., a solution that combines regional traffic characteristics and wireless backhaul small stations is desired in 5G systems, so that UEs needing different traffics in different regions can be served better.

SUMMARY

In order to overcome the problems in the related art, embodiments of the disclosure provide a method and device for accessing a network, a UE, and a base station. By means of wireless backhaul small base stations deployed in different regions and supporting different traffic types, corresponding types of traffic services are provided for UEs, so that the UEs can be served better.

According to a first aspect of the embodiments of the disclosure, a method for accessing a network is provided. The method may be applied to a UE. The method may include:

determining, based on a traffic type of data to be transmitted and a service type of at least one a wireless backhaul small base station, a wireless backhaul small base station to be accessed; and accessing the wireless backhaul small base station.

In one embodiment, the method may further include:

monitoring system signaling broadcast by the at least one wireless backhaul small base station; and parsing, in response to the system signaling being detected, the system signaling to obtain a service type of a traffic provided by the wireless backhaul small base station.

In one embodiment, the service type of the wireless backhaul small base station is indicative of: quality of service (QoS) of a traffic provided by the at least one wireless backhaul small base station, or a traffic type of a traffic provided by the at least one wireless backhaul small base station.

In one embodiment, before determining, based on the traffic type of data to be transmitted and the service type of the at least one wireless backhaul small base station, a wireless backhaul small base station to be accessed, the method may further include:

preferentially selecting, when no base station is accessed, a macro base station with a wired backhaul capability for access.

In one embodiment, the operation of accessing the wireless backhaul small base station may include:

switching from the macro base station to the wireless backhaul small base station; or, establishing a secondary connection with the wireless backhaul small base station while maintaining a connection with the macro base station.

In one embodiment, the operation of determining, based on the traffic type of data to be transmitted and the service type of the at least one wireless backhaul small base station, the wireless backhaul small base station to be accessed may include:

determining, based on the traffic type of data to be transmitted and the service type of the at least one wireless backhaul small base station, a wireless backhaul small base station capable of supporting transmission of the data to be transmitted by the UE as the wireless backhaul small base station to be accessed.

According to a second aspect of the embodiments of the disclosure, a method for accessing a network is provided. The method may be applied to a wireless backhaul small base station. The method may include:

determining a service type of a wireless backhaul small base station, the service type being indicative of a service type of a traffic provided by the wireless backhaul small base station; and broadcasting the service type through system signaling.

In one embodiment, the operation of determining the service type of the wireless backhaul small base station may include:

determining the service type based on the QoS of the traffic provided by the wireless backhaul small base station; or determining the service type based on a traffic type of a traffic provided by the wireless backhaul small base station.

According to a third aspect of the embodiments of the disclosure, a device for accessing a network is provided. The method may be applied to a UE. The device may include:

a first determination module, configured to determine, based on a traffic type of data to be transmitted and a service type of at least one wireless backhaul small base station, a wireless backhaul small base station to be accessed; and a first access module, configured to access the wireless backhaul small base station.

In one embodiment, the device may further include:

a monitoring module, configured to monitor system signaling broadcast by the at least one wireless backhaul small base station; and a parsing module, configured to parse, in response to the system signaling being detected, the system signaling to obtain a service type of a traffic provided by the at least one wireless backhaul small base station.

In one embodiment, the service type of the wireless backhaul small base station may indicate the QoS of a traffic provided by the at least one wireless backhaul small base station, or may indicate a traffic type of a traffic provided by the at least one wireless backhaul small base station.

In one embodiment, the device may further include:

a second access module, configured to preferentially select, when no base station is accessed, a macro base station with a wired backhaul capability for access.

In one embodiment, the first access module may include:

a switching sub-module, configured to switch from the macro base station to the wireless backhaul small base station; or, a connection establishment sub-module, configured to establish a secondary connection with the wireless backhaul small base station while maintaining a connection with the macro base station.

In one embodiment, the first determination module may be configured to select, based on the traffic type of data to be transmitted and the service type of the at least one wireless backhaul small base station, a wireless backhaul small base station capable of supporting transmission of the data to be transmitted by the UE as a wireless backhaul small base station to be accessed.

According to a fourth aspect of the embodiments of the disclosure, a device for accessing a network is provided. The device may be applied to a wireless backhaul small base station. The device may include:

a second determination module, configured to determine a service type of a wireless backhaul small base station, the service type indicating a service type of a traffic provided by the wireless backhaul small base station; and a broadcast module, configured to broadcast the service type through system signaling.

In one embodiment, the second determination module may include:

a first determination sub-module, configured to determine the service type based on the QoS of a traffic provided by the wireless backhaul small base station; or a second determination sub-module, configured to determine the service type based on a traffic type of a traffic provided by the wireless backhaul small base station.

According to a fifth aspect of the embodiments of the disclosure, a UE is provided. The UE may include:

a processor; and a memory configured to store instructions executable for the processor.

The processor may be configured to:

determine, based on a traffic type of data to be transmitted and a service type of at least one wireless backhaul small base station, a wireless backhaul small base station to be accessed; and access the wireless backhaul small base station.

According to a sixth aspect of the embodiments of the disclosure, a base station is provided. The base station may include:

a processor; and a memory configured to store instructions executable for the processor.

The processor may be configured to:

determine a service type of a wireless backhaul small base station, the service type being indicative of a service type of a traffic provided by the wireless backhaul small base station; and broadcast the service type through system signaling.

According to a seventh aspect of the embodiments of the disclosure, it is provided a non-transitory computer-readable storage medium having stored therein computer instructions that, when executed by a processor, cause the processor to perform the following operations:

determining, based on a traffic type of data to be transmitted and a service type of at least one wireless backhaul small base station, a wireless backhaul small base station to be accessed; and accessing the wireless backhaul small base station.

According to an eighth aspect of the embodiments of the disclosure, it is provided a non-transitory computer-readable storage medium having stored therein computer instructions that, when executed by a processor, cause the processor to perform the following operations:

determining a service type of a wireless backhaul small base station, the service type being indicative of a service type of a traffic provided by the wireless backhaul small base station; and broadcasting the service type through system signaling.

The technical solutions provided by the embodiments of the disclosure may include the following beneficial effects.

When a UE accesses a base station, a wireless backhaul small base station that matches a traffic type of traffic to be initiated by the UE may be preferentially selected for access. For example, if the traffic type of traffic to be initiated by a user is an Internet access traffic, a base station with a traffic type being the Internet access traffic may be preferentially selected for access. If the traffic type of traffic to be initiated by the user is a video browsing traffic, a small base station with a traffic type being a high-definition video providing service may be preferentially selected for access. Therefore, the UE may be served better by the wireless backhaul small base station with service characteristics.

It is to be understood that the above general descriptions and detailed descriptions below are only exemplary and explanatory and not intended to limit the disclosure.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figure 1A:
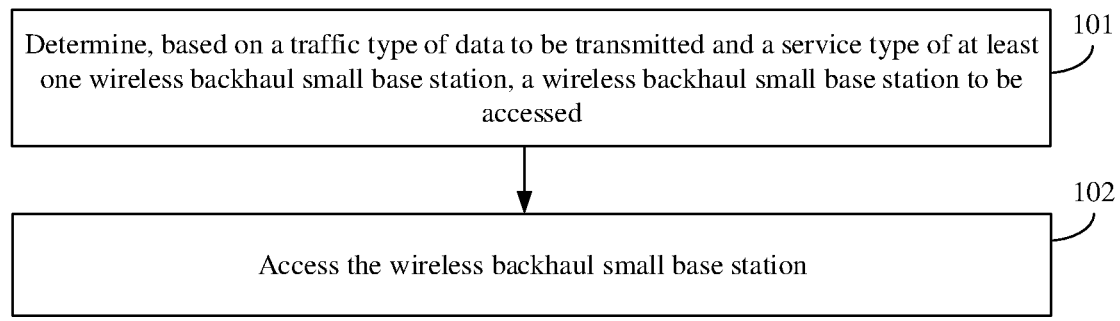
FIG. 1A is a flowchart of a method for accessing a network according to an exemplary embodiment.
Figure 1B:
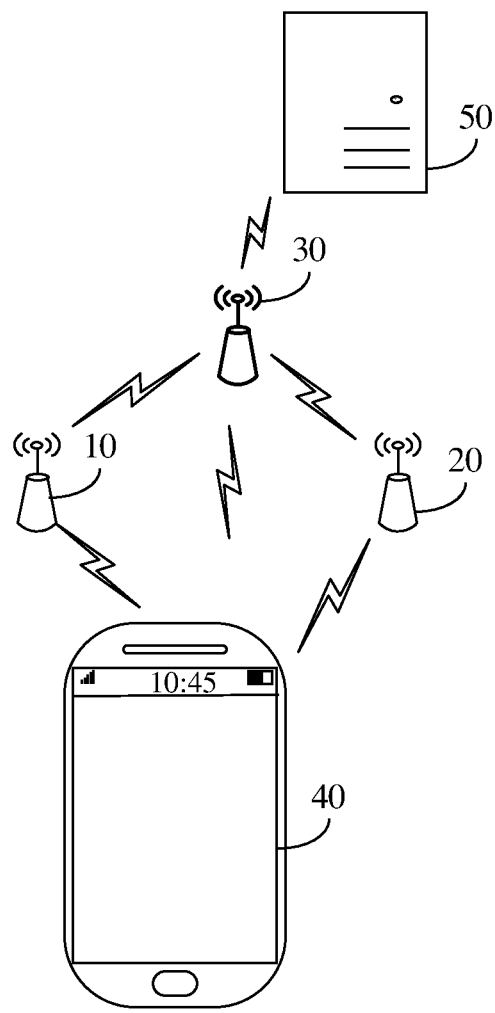
FIG. 1B is an application scenario diagram of a method for accessing a network according to an exemplary embodiment.

FIG. 1A is a flowchart of a method for accessing a network according to an exemplary embodiment. FIG. 1B is an application scenario diagram of a method for accessing a network according to an exemplary embodiment. The method for accessing a network may be applied to a UE. As illustrated in FIG. 1A, the method for accessing the network may include the following steps 101 and 102.

At step 101, a wireless backhaul small base station to be accessed is determined based on a traffic type of data to be transmitted and a service type of at least one wireless backhaul small base station.

In one embodiment, the traffic type of data to be transmitted may be an Internet access traffic, a video browsing traffic, an online game traffic, and the like.

In one embodiment, the service type of the wireless backhaul small base station may be defined by the quality of service (QoS) of a service. That is, the service types of the wireless backhaul small base stations are classified based on transmission bandwidths (throughput rates), transmission delays, data packet loss rates and the like. For example, a wireless backhaul small base station 1 is capable of providing services with the QoS requirements, such as supporting the transmission of data streams such as voice, audio, and video. A wireless backhaul small base station 2 is capable of providing services with high QoS requirements, such as services for online games.

In one embodiment, the service type of the wireless backhaul small base station may be defined by a traffic type of a specific traffic supported by the small base station. For example, the base station supports an Internet access traffic, or a video browsing traffic, or a file download traffic.

In one embodiment, in order to implement the technical solution provided by the disclosure, an operator needs to deploy wireless backhaul small base stations supporting different traffics in different regions according to their own requirements (which may also be understood as the requirements of a majority of UEs). For example, wireless backhaul small base stations supporting Internet access traffics are deployed in shopping malls, and wireless backhaul small base stations supporting video browsing traffics are deployed at train stations. Therefore, wireless backhaul small base stations in different regions may provide traffics matching traffic requirements for UEs in the regions.

In one embodiment, a UE may select, based on a traffic type of data to be transmitted and a service type of at least one wireless backhaul small base station, a wireless backhaul small base station capable of supporting that the UE transmits the data to be transmitted is determined as a wireless backhaul small base station to be accessed. For example, if traffic to be initiated by the UE is a video browsing traffic, that is, the traffic type of data to be transmitted is a video browsing traffic, a wireless backhaul small base station supporting the video browsing traffic may be selected as a wireless backhaul small base station to be accessed.

At step 102, the wireless backhaul small base station is accessed.

In one embodiment, if the UE has established a connection with a macro base station before accessing the wireless backhaul small base station, the UE may switch from the macro base station to the wireless backhaul small base station; or, the UE may establish a dual connection with the macro base station and the wireless backhaul small base station.

In one embodiment, the process of switching from a macro base station to a wireless backhaul small base station and the process of establishing a dual connection with the macro base station and the wireless backhaul small base station may both refer to the method processes in the related art, and will not be described in detail herein.

In an exemplary scenario, as illustrated in FIG. 1B, a wireless backhaul small base station 10 with a wireless backhaul capability, a wireless backhaul small base station 20 with a wireless backhaul capability, a base station 30 with a wired backhaul capability, a UE 40 and a core network device 50 are provided. The wireless backhaul small base station 10 with the wireless backhaul capability and the wireless backhaul small base station 20 with the wireless backhaul capability may implement wireless backhauls with the core network device 50 through wireless connections with the base station 30 with the wired backhaul capability. When required to access the base station or switch to the base station, the UE 40 may determine, based on a traffic type of data to be transmitted by the UE 40 and a service type of each wireless backhaul small base station, a wireless backhaul small base station to be accessed.

In this embodiment, by means of step 101 and step 102, when a UE accesses a base station, a wireless backhaul small base station that matches the type of traffic to be initiated by the UE may be preferentially selected for access. For example, if the type of traffic to be initiated by a user is Internet access traffic, a base station with a service type being the Internet access traffic may be preferentially selected for access. If the type of traffic to be initiated by the user is a video browsing traffic, a small base station with a service type being a high-definition video providing traffic may be preferentially selected for access. Therefore, the UE may be served better by the wireless backhaul small base station with traffic characteristics.

For details on how to implement network access of the UE, reference may be made to the subsequent embodiments.

The following describes the technical solutions provided by the embodiments of the disclosure with specific embodiments.

Figure 2:
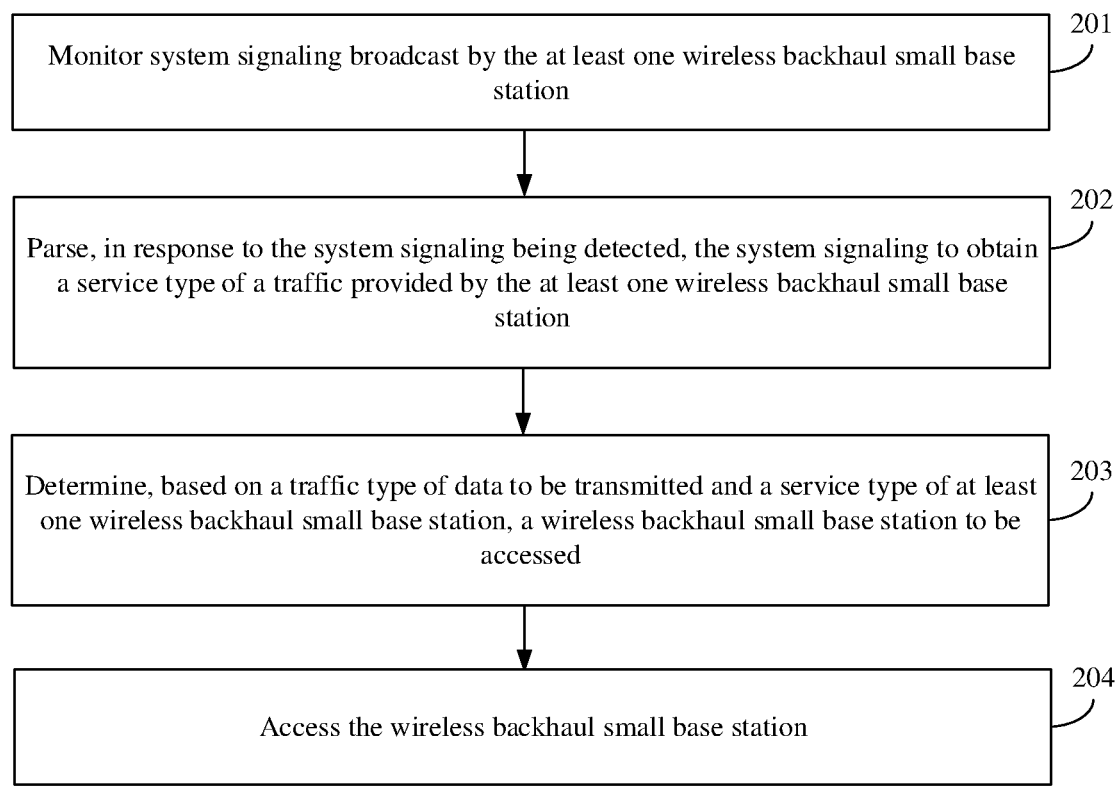
FIG. 2 is a flowchart of another method for accessing a network according to an exemplary embodiment.

FIG. 2 is a flowchart of another method for accessing a network according to an exemplary embodiment. In this embodiment, the above method provided in the embodiment of the disclosure is used to take an example of how a UE accesses a wireless backhaul small base station. As illustrated in FIG. 2, the method includes the following steps.

At step 201, system signaling broadcast by the wireless backhaul small base station is monitored.

In one embodiment, the wireless backhaul small base station may carry the service type of the traffic provided by the wireless backhaul small base station in the broadcast system signaling.

In one embodiment, the service type of the wireless backhaul small base station may be defined by the QoS of a service. That is, the service types of the wireless backhaul small base stations are classified based on transmission bandwidth (throughput rated), transmission delays, data packet loss rates and the like. For example, a wireless backhaul small base station 1 can provide services with the QoS requirements, such as supporting the transmission of data streams such as voice, audio, and video. A wireless backhaul small base station 2 can provide services with high QoS requirements, such as services for online games. In one embodiment, the service type of the wireless backhaul small base station may be defined by a traffic type of a specific traffic supported by the small base station. For example, the base station supports an Internet access service, or a video browsing traffic, or a file download traffic.

At step 202, in response to the system signaling being detected, a service type of a traffic provided by the wireless backhaul small base station is obtained by parsing the system signaling.

At step 203, a wireless backhaul small base station to be accessed is determined based on a traffic type of data to be transmitted and a service type of at least one wireless backhaul small base station.

At step 204, the wireless backhaul small base station is accessed.

In one embodiment, the operations illustrated in steps 203 and 204 may be referred to the description of steps 101 and 102 in the embodiment illustrated in FIG. 1A, and will not be described in detail herein.

In this embodiment, a UE may determine, based on broadcast signaling of a detected wireless backhaul small base station, a service type of traffic supported by the wireless backhaul small base station, and then access a wireless backhaul small base station that matches a traffic type of data to be transmitted by the UE for better service.

Figure 3:
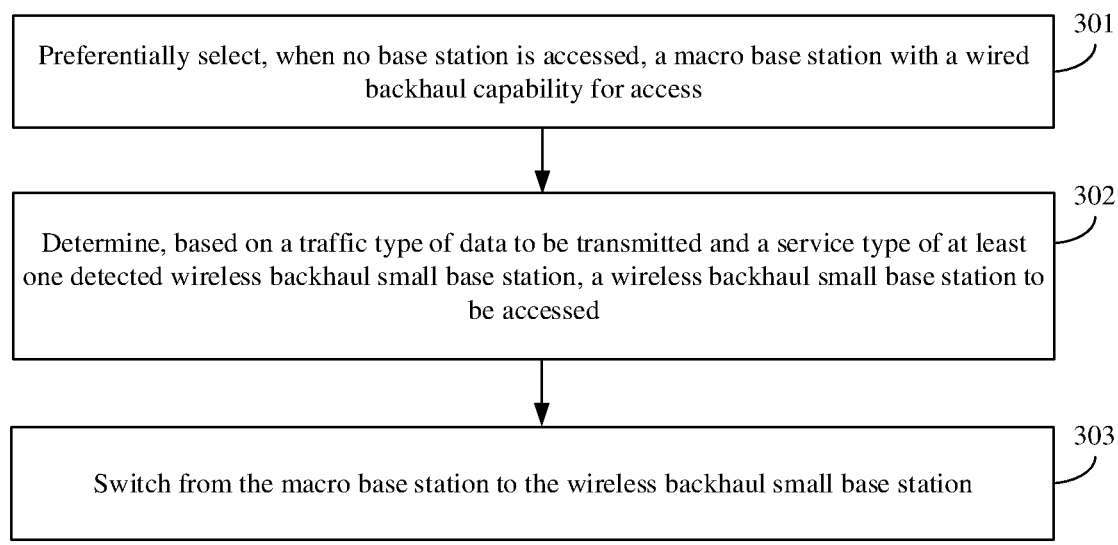
FIG. 3 is a flowchart of yet another method for accessing a network according to an exemplary embodiment.

FIG. 3 is a flowchart of yet another method for accessing a network according to an exemplary embodiment. In this embodiment, the above method provided in the embodiment of the disclosure is used to take an example of how a UE accesses a wireless backhaul small base station. As illustrated in FIG. 3, the method includes the following steps.

At step 301, when no base station is accessed, a macro base station with a wired backhaul capability is preferentially selected for access.

In one embodiment, when a UE is powered on for network access, a macro base station with a wired backhaul capability may be preferentially selected for access, thereby ensuring coverage.

In one embodiment, a base station with a wired backhaul capability may provide the most basic services that occupy the smallest bandwidth, such as voice calls, so that when the UE accesses the macro base station, it can be ensured that the most basic traffic support is obtained.

At step 302, a wireless backhaul small base station to be accessed is determined based on a traffic type of data to be transmitted and a service type of at least one detected wireless backhaul small base station.

In one embodiment, after accessing a macro base station, a UE may continue to detect whether there is a suitable wireless backhaul small base station capable of supporting a traffic of the UE by monitoring broadcast signaling, and select, after one or more wireless backhaul small base stations are detected, based on a service type broadcast by the one or more wireless backhaul small base stations, of a provided traffic, a base station suitable for access.

At step 303, the UE is switched from the macro base station to the wireless backhaul small base station.

In this embodiment, when a UE is powered on, a macro base station with a wired backhaul capability is preferentially accessed to ensure coverage, and the most basic traffic support is obtained. After detecting a small base station that matches a traffic type of data to be transmitted by the UE, the UE may switch to a wireless backhaul small base station. With high-band characteristics and traffic matching characteristics of a small base station, the UE may obtain better traffic support.

Figure 4:
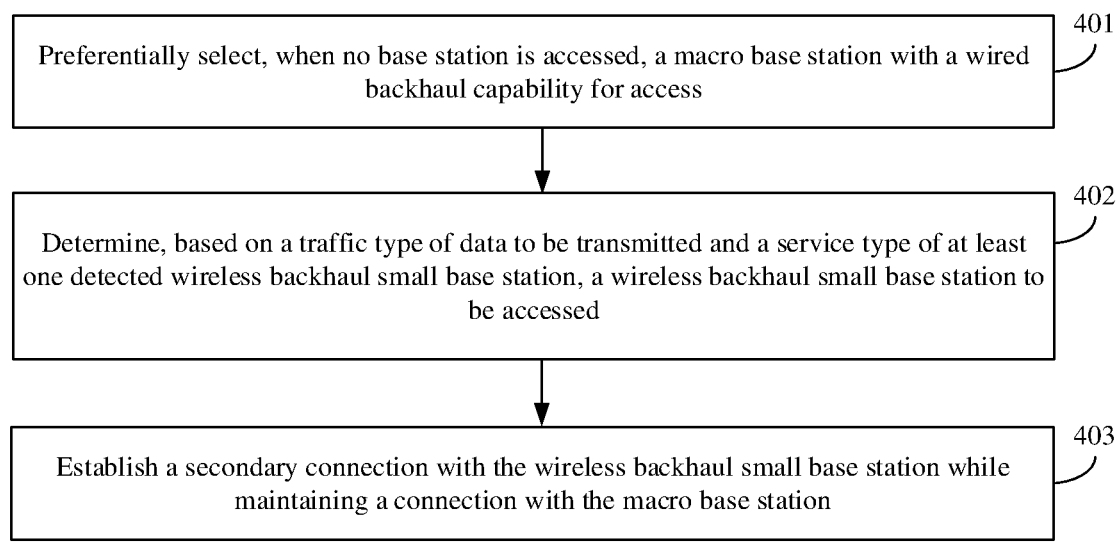
FIG. 4 is a flowchart of still another method for accessing a network according to an exemplary embodiment.

FIG. 4 is a flowchart of another method for accessing a network according to an exemplary embodiment. In this embodiment, the above method provided in the embodiment of the disclosure is used to take an example of how a UE accesses a wireless backhaul small base station. As illustrated in FIG. 4, the method includes the following steps.

At step 401, when no base station is accessed, a macro base station with a wired backhaul capability is preferentially selected for access.

At step 402, a wireless backhaul small base station to be accessed is determined based on a traffic type of data to be transmitted and a service type of at least one detected wireless backhaul small base station.

In one embodiment, the description of steps 401 and 402 may be referred to the description of steps 301 and 302 in the embodiment illustrated in FIG. 3, and will not be described in detail herein.

At step 403, when maintaining a connection with the macro base station, a secondary connection with the wireless backhaul small base station is established.

In this embodiment, when a UE is powered on, a macro base station with a wired backhaul capability is preferentially accessed to ensure coverage, and the most basic traffic support is obtained. After detecting a wireless backhaul small base station that matches a traffic type of data to be transmitted by the UE, the UE may access the wireless backhaul small base station by establishing a dual-connection. With high-band characteristics and traffic matching characteristics of the small base station and large coverage characteristics of the macro base station, the UE may obtain better traffic support.

Figure 5:
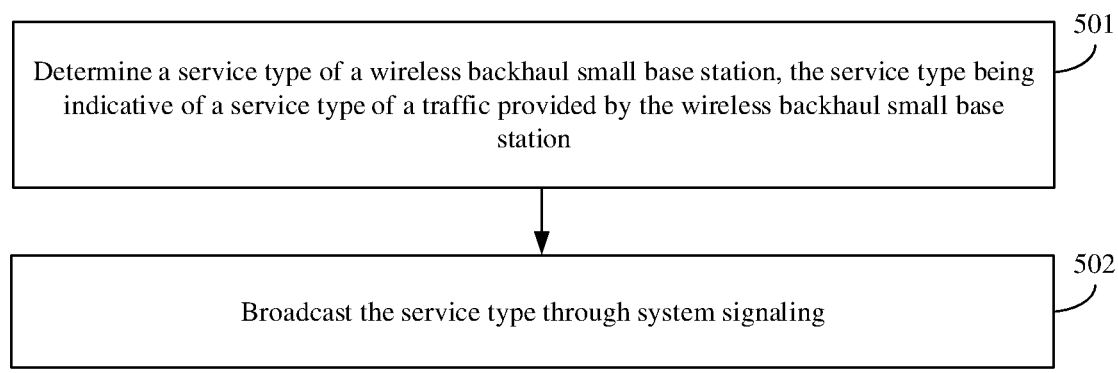
FIG. 5 is a flowchart of a method for accessing a network according to an exemplary embodiment.

FIG. 5 is a flowchart of a method for accessing a network according to an exemplary embodiment. The method for accessing a network in this embodiment may be applied to a wireless backhaul small base station. As illustrated in FIG. 5, the method includes the following steps 501 and 502.

At step 501, a service type of a wireless backhaul small base station is determined. Here, the service type is indicative of a service type of a traffic provided by the wireless backhaul small base station.

In one embodiment, the wireless backhaul small base station may determine a service type based on the QoS of the provided traffic. For example, a wireless backhaul small base station 1 can provide services with the QoS requirements, such as supporting the transmission of data streams such as voice, audio, and video. A wireless backhaul small base station 2 can provide services with high QoS requirements, such as services for online games.

In one embodiment, the wireless backhaul small base station may determine a service type based on a traffic type of the provided traffic. For example, a wireless backhaul small base station supporting an Internet access traffic, or a wireless backhaul small base station supporting a video browsing traffic, or a wireless backhaul small base station supporting a file download traffic, and the like.

At step 502, the service type is broadcast through system signaling. In an exemplary scenario, as illustrated in FIG. 1B, a wireless backhaul small base station 10 with a wireless backhaul capability, a wireless backhaul small base station 20 with a wireless backhaul capability, a base station 30 with a wired backhaul capability, a UE 40 and a core network device 50 are provided. The wireless backhaul small base station 10 with the wireless backhaul capability and the wireless backhaul small base station 20 with the wireless backhaul capability may implement wireless backhauls with the core network device 50 through wireless connections with the base station 30 with the wired backhaul capability. The wireless backhaul small base station with the wireless backhaul capability may broadcast a traffic type of a traffic provided by the wireless backhaul small base station. Therefore, when required to access the base station or switch to the base station, the UE 40 may determine, based on a traffic type of data to be transmitted and a service type of each wireless backhaul small base station, a wireless backhaul small base station to be accessed.

In this embodiment, each wireless backhaul small base station may broadcast its own service type, so that a UE may preferentially select a base station with a service type being Internet access traffic for access. If the type of traffic to be initiated by a user is a video browsing traffic, a small base station with a service type being a high-definition video providing traffic may be preferentially selected for access. Therefore, the UE may be served better by the wireless backhaul small base station with service characteristics.

Figure 6:
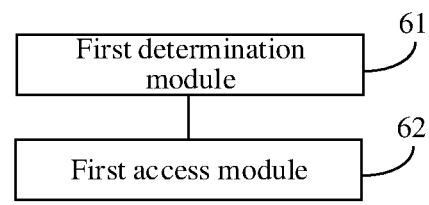
FIG. 6 is a block diagram of a device for accessing a network according to an exemplary embodiment.

FIG. 6 is a block diagram of a device for accessing a network according to an exemplary embodiment. The device is applied to a UE. As illustrated in FIG. 6, the device for accessing a network includes: a first determination module 61 and a first access module 62.

The first determination module 61 is configured to determine, based on a traffic type of data to be transmitted and a service type of at least one a wireless backhaul small base station, a wireless backhaul small base station to be accessed.

The first access module 62 is configured to access the wireless backhaul small base station.

In this embodiment, when a UE accesses a base station, a wireless backhaul small base station that matches the type of traffic to be initiated by the UE may be preferentially selected for access. For example, if the type of traffic to be initiated by a user is an Internet access traffic, a base station with a service type being the Internet access traffic may be preferentially selected for access. If the type of traffic to be initiated by the user is a video browsing traffic, a small base station with a service type being a high-definition video providing traffic may be preferentially selected for access. Therefore, the UE may be served better by the wireless backhaul small base station with service characteristics.

Figure 7:
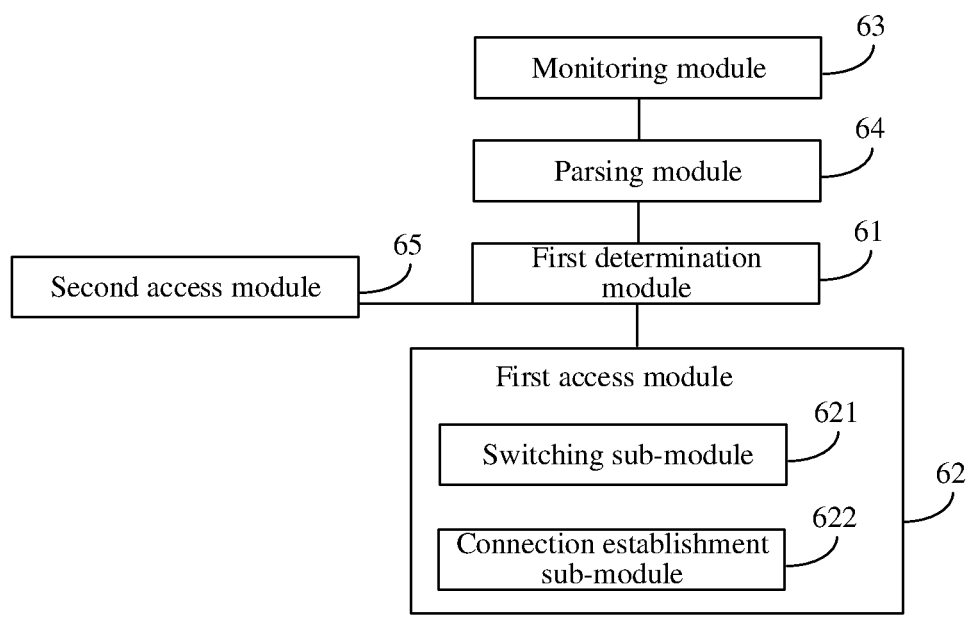
FIG. 7 is a block diagram of another device for accessing a network according to an exemplary embodiment.

FIG. 7 is a block diagram of another device for accessing a network according to an exemplary embodiment. As illustrated in FIG. 7, on the basis of the embodiment illustrated in FIG. 6, in one embodiment, the device further includes: a monitoring module 63 and a parsing module 64.

The monitoring module 63 is configured to monitor system signaling broadcast by the at least one wireless backhaul small base station.

The parsing module 64 is configured to parse, in response to the system signaling being detected, the system signaling to obtain a service type of a traffic provided by the at least one wireless backhaul small base station.

In this embodiment, a UE may determine, based on broadcast signaling of the detected wireless backhaul small base station, a service type of traffic supported by the wireless backhaul small base station, and then access a wireless backhaul small base station that matches a traffic type of data to be transmitted by the UE for better service.

In one embodiment, the service type of the wireless backhaul small base station is indicative of: QoS of a provided traffic, or a traffic type of a provided traffic.

In this embodiment, a mode in which a wireless backhaul small base station defines a service type is disclosed.

In one embodiment, the device further includes: a second access module 65.

The second access module 65 is configured to preferentially select, when no base station is accessed, a macro base station with a wired backhaul capability for access.

In this embodiment, a UE preferentially accesses a macro base station with a wired backhaul capability when powered on. The coverage can be ensured, and the most basic traffic support can be obtained.

In one embodiment, the first access module 62 includes: a switching sub-module 621 or a connection establishment sub-module 622.

The switching sub-module 621 is configured to switch from the macro base station to the wireless backhaul small base station.

The connection establishment sub-module 622 is configured to establish a secondary connection with the wireless backhaul small base station while maintaining a connection with the macro base station.

In this embodiment, after accessing a macro base station, a UE may continue to detect a wireless backhaul small base station that conforms to a traffic type of data to be transmitted by the UE, and may switch to the wireless backhaul small base station or establish a dual connection. With high-band characteristics and traffic matching characteristics of a small base station, the UE may obtain better traffic support.

In one embodiment, the first determination module 61 is configured to determine, based on a traffic type of data to be transmitted and a service type of at least one wireless backhaul small base station, a wireless backhaul small base station capable of supporting transmission of data to be transmitted by the UE as a wireless backhaul small base station to be accessed.

In this embodiment, a UE selects a wireless backhaul small base station capable of supporting transmission of data to be transmitted by the UE as a wireless backhaul small base station to be accessed, so that the efficiency of traffic data transmission of the UE can be improved.

Figure 8:
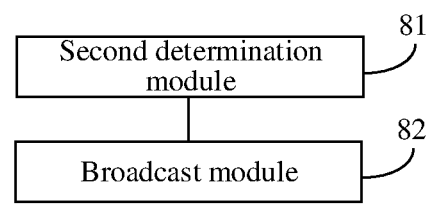
FIG. 8 is a block diagram of a device for accessing a network according to an exemplary embodiment.

FIG. 8 is a block diagram of a device for accessing a network according to an exemplary embodiment. The device is applied to a wireless backhaul small base station. As illustrated in FIG. 8, the network access device includes: a second determination module 81 and a broadcast module 82.

The second determination module 81 is configured to determine a service type of a wireless backhaul small base station, the service type being indicative of a traffic type of a traffic provided by the wireless backhaul small base station.

The broadcast module 82 is configured to broadcast the service type through system signaling.

In this embodiment, each wireless backhaul small base station may broadcast its own service type, so that a UE may preferentially select a base station with a service type being an Internet access traffic for access. If the type of traffic to be initiated by a user is a video browsing traffic, a small base station with a service type being a high-definition video providing traffic may be preferentially selected for access. Therefore, the UE may be served better by the wireless backhaul small base station with traffic characteristics.

Figure 9:
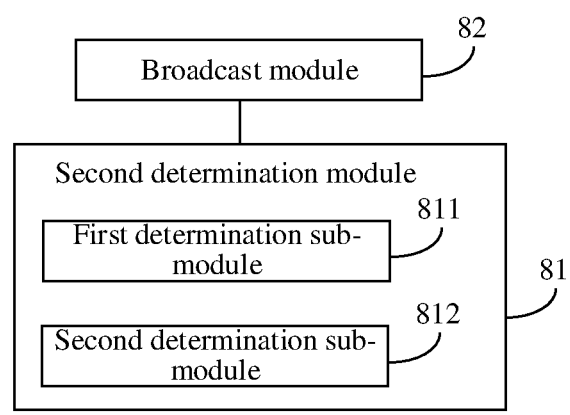
FIG. 9 is a block diagram of another device for accessing a network according to an exemplary embodiment.

FIG. 9 is a block diagram of another device for accessing a network according to an exemplary embodiment. Based on the embodiment illustrated in FIG. 8, as illustrated in FIG. 9, in one embodiment, the second determination module 81 includes: a first determination sub-module 811 or a second determination sub-module 812.

The first determination sub-module 811 is configured to determine the service type based on the QoS of a provided traffic.

The second determination sub-module 812 is configured to determine the service type based on a traffic type of a provided traffic.

In this embodiment, two modes in which a wireless backhaul small base station defines a service type are disclosed.

Figure 10:
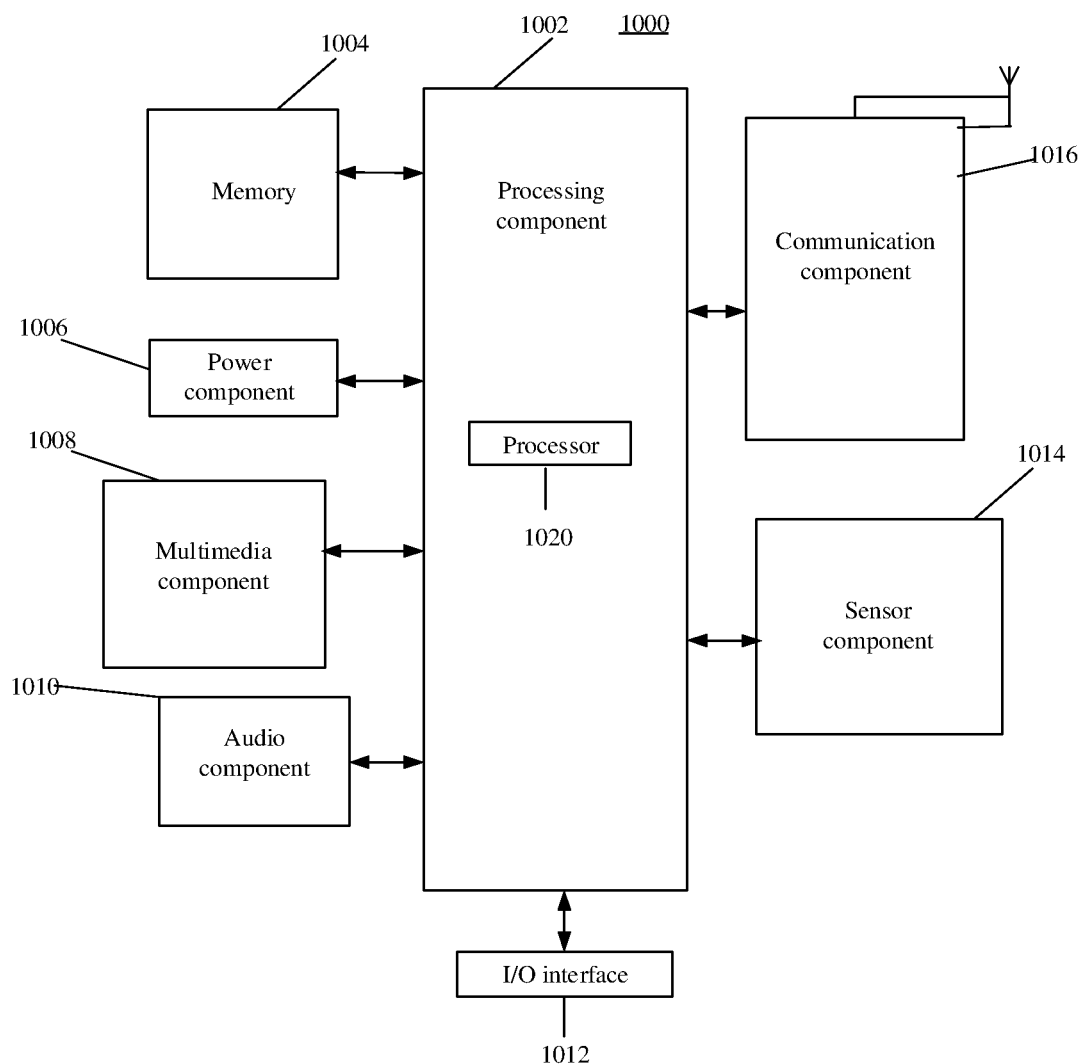
FIG. 10 is a block diagram of a device for accessing a network according to an exemplary embodiment.

FIG. 10 is a block diagram of a detection device suitable for scheduling signaling according to an exemplary embodiment. For example, a device 1000 may be a UE such as a mobile phone, a computer, a digital broadcast terminal, a messaging device, a gaming console, a tablet, a medical device, exercise equipment, and a personal digital assistant.

Referring to FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as operations associated with display, telephone calls, data communications, camera operations, and recording operations. The processing component 1002 may include one or more processors 1020 to execute instructions to perform all or part of the operations in the above described methods. Moreover, the processing component 1002 may include one or more modules which facilitate the interactions between the processing component 1002 and other components. For example, the processing component 1002 may include a multimedia module to facilitate the interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management and distribution of power in the device 1000.

The multimedia component 1008 includes a screen providing an output interface between the device 1000 and the user. In some embodiments, the screen may include a liquid crystal display (LCD) and a touch panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 1008 includes a front camera and/or a rear camera. The front camera and/or the rear camera may receive an external multimedia datum while the device 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone (MIC) configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, or buttons. The buttons may include, but are not limited to, a home button, a volume button, a starting button, and a locking button.

The sensor component 1014 includes one or more sensors to provide status assessments of various aspects of the device 1000. For example, the sensor component 1014 may detect an open/closed status of the device 1000, and relative positioning of components. For example, the component is the display and the keypad of the device 1000. The sensor component 1014 may also detect a change in position of the device 1000 or a component of the device 1000, a presence or absence of user contact with the device 1000, an orientation or an acceleration/deceleration of the device 1000, and a change in temperature of the device 1000. The sensor component 1014 may include a proximity sensor configured to detect the presence of nearby objects without any physical contact. The sensor component 1014 may also include a light sensor, such as a complementary metal oxide semiconductor (CMOS) or charge coupled device (CCD) image sensor, for use in imaging applications. In some embodiments, the sensor component 1014 may also include an acceleration sensor, a gyroscope sensor, a magnetic sensor, a pressure sensor, or a temperature sensor.

The communication component 1016 is configured to facilitate communication, wired or wirelessly, between the device 1000 and other devices. The device 1000 may access a wireless network based on a communication standard, such as WiFi, 2G or 3G, or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above described methods.

In exemplary embodiments, there is also provided a non-transitory computer-readable storage medium including instructions, such as included in the memory 1004, executable by the processor 1020 of the device 1000 configured to perform the method described in the first aspect: determining, based on a traffic type of data to be transmitted and a service type of a wireless backhaul small base station, a wireless backhaul small base station to be accessed; and accessing the wireless backhaul small base station.

In one embodiment, the non-transitory computer-readable storage medium may be a ROM, a random access memory (RAM), a compact disc read-only memory (CD-ROM), a magnetic tape, a floppy disc, an optical data storage device and the like.

Figure 11:
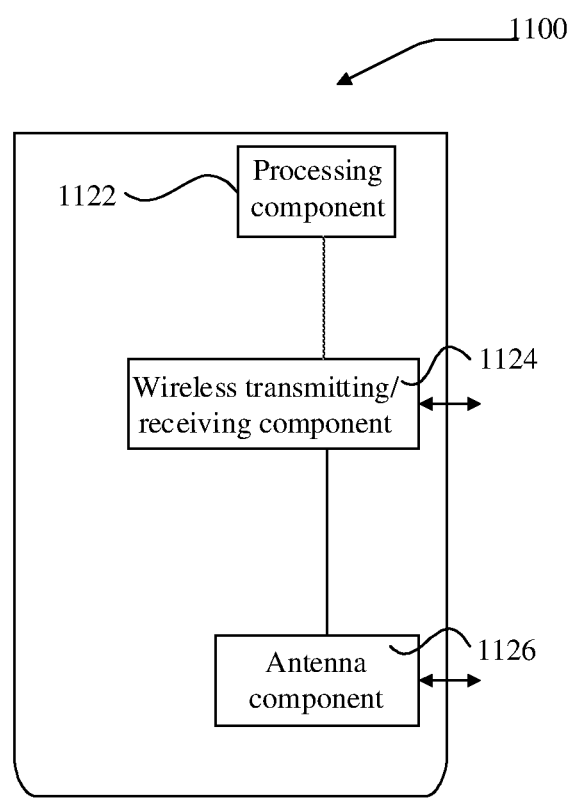
FIG. 11 is a block diagram of a device for accessing a network according to an exemplary embodiment.

FIG. 11 is a block diagram illustrating a device suitable for data sending, according to an exemplary embodiment. A device 1100 may be provided as a base station. Referring to FIG. 11, the device 1100 includes a processing component 1122, a wireless transmitting/receiving component 1124, an antenna component 1126, and a wireless interface-specific signal processing portion. The processing component 1122 may further include one or more processors.

One of the processors in the processing component 1122 may be configured to perform the network access method described in the second aspect.

In exemplary embodiments, there is also provided a non-transitory computer-readable storage medium including instructions, executable by the processor 1122 of the device 1100 to complete the method described in the second aspect. For example, the non-transitory computer-readable storage medium may be a ROM, a RAM, a CD-ROM, a magnetic tape, a floppy disc, an optical data storage device and the like.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for accessing a network, performed by user equipment (UE), the method comprising:
   preferentially selecting, when no base station is accessed, a macro base station with a wired backhaul capability for access;
   determining, based on a traffic type of data to be transmitted and a service type of at least one wireless backhaul small base station, a wireless backhaul small base station to be accessed; and
   establishing a secondary connection with the wireless backhaul small base station while maintaining a connection with the macro base station,
   wherein the traffic type of data to be transmitted comprises: an Internet access traffic, a video browsing traffic, or an online game traffic; and
   wherein the service type of the at least one wireless backhaul small base station is indicative of: quality of service (QoS) of a traffic provided by the at least one wireless backhaul small base station, or a traffic type of a traffic provided by the at least one wireless backhaul small base station.

2. The method of claim 1, further comprising:
   monitoring system signaling broadcast by the at least one wireless backhaul small base station; and
   parsing, in response to the system signaling being detected, the system signaling to obtain a service type of the traffic provided by the at least one wireless backhaul small base station.

3. The method of claim 1, wherein determining, based on the traffic type of data to be transmitted and the service type of the at least one wireless backhaul small base station, the wireless backhaul small base station to be accessed comprises:
   determining, based on the traffic type of data to be transmitted and the service type of the at least one wireless backhaul small base station, a wireless backhaul small base station capable of supporting transmission of the data to be transmitted by the UE as the wireless backhaul small base station to be accessed.

4. A non-transitory computer-readable storage medium having stored therein computer instructions that, when executed by a processor of user equipment, cause the user equipment to perform the method for accessing a network according to claim 1.

5. User equipment (UE), comprising:
   a processor; and
   a memory configured to store instructions executable by the processor,
   wherein the processor is configured to:
   preferentially select, when no base station is accessed, a macro base station with a wired backhaul capability for access;
   determine, based on a traffic type of data to be transmitted and a service type of at least one wireless backhaul small base station, a wireless backhaul small base station to be accessed; and
   establish a secondary connection with the wireless backhaul small base station while maintaining a connection with the macro base station,
   wherein the traffic type of data to be transmitted comprises: an Internet access traffic, a video browsing traffic, or an online game traffic; and
   wherein the service type of the at least one wireless backhaul small base station is indicative of: quality of service (QoS) of a traffic provided by the at least one wireless backhaul small base station, or a traffic type of a traffic provided by the at least one wireless backhaul small base station.

6. The UE of claim 5, wherein the processor is further configured to:
   monitor system signaling broadcast by the at least one wireless backhaul small base station; and
   parse, in response to the system signaling being detected, the system signaling to obtain a service type of the traffic provided by the at least one wireless backhaul small base station.

7. The UE of claim 5, wherein the processor is further configured to determine, based on the traffic type of data to be transmitted and the service type of the at least one wireless backhaul small base station, a wireless backhaul small base station capable of supporting transmission of the data to be transmitted by the UE as the wireless backhaul small base station to be accessed.

\* \* \* \* \*